Patented July 30, 1929.

1,722,803

UNITED STATES PATENT OFFICE.

ERWIN KLEIN, OF VOSLAU, NEAR VIENNA, AUSTRIA, ASSIGNOR TO THE FLEISCHMANN COMPANY, OF NEW YORK, N. Y., A CORPORATION OF OHIO.

PROCESS FOR THE MANUFACTURE OF YEAST.

No Drawing. Application filed August 17, 1923, Serial No. 657,966, and in Austria August 29, 1922.

The object of my invention is to provide a process for the production of yeast, especially of bakers' yeast, upon a commercial scale and in a satisfactory and economical manner.

In its more specific embodiment, one of the primary objects of my present invention is to produce a high yield of "forced" yeast by forcing yeast to grow in large amounts in a nutrient solution containing a high proportion of difficultly assimilable substances, particularly those derived from or contained in materials which have been heretofore known as waste products during which the yeast is weakened; and thereafter strengthening the "forced" yeast so produced, by further propagation in a nutrient solution containing a preponderance of relatively easily assimilable substances whereby a yeast of good quality and baking strength is obtained.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

It has been ascertained that yeast, if contained in a nutrient solution, where it is supplied with nutrition of the most varied nature, during the first period or stage chiefly attacks the most easily assimilable substances, in the next period attacks chiefly the other easily assimilable substances etc., such series of periods in which increasingly difficultly assimilable substances are attacked, continuing until finally when the contact between the yeast and the nutrient solution has lasted sufficiently long, substances are attacked which are very difficult to attack. Even though it may not be advisable to attempt an exact grouping of the yeast-nutrient substances on this basis, since many possible variations may exist and various external causes may exert an influence on the selective utilization of nutrients by yeast, nevertheless the following rough grouping of sources of carbon available as yeast-nutrients may serve the better to characterize my present invention, hereinafter described:

1: *Substances most easily consumed*: Certain sugars, for example, sucrose, dextrose, levulose, maltose, etc; certain amino acids, for example asparagin, leucine, etc.

2: *Substances easily attacked or assimilated*: Other amino acids, for example, the aromatic amino acids, such as tyrosine, etc; other substances closely related to sugar, such, for example, as glycerine; certain organic acids, for example lactic, malic, etc.

3: *Substances harder to attack or assimilate*: Other organic acids such, for example, as tartaric and citric acids, alcohol, etc.

4: *Substances attacked, or assimilated only in case other sources of carbon are present in at least but small amounts*: Carbon compounds which have been eliminated by the yeast, such as, for example, glycogen.

Under the conditions which generally prevailed in the manufacture of yeast until about 10 years ago, sugar was only made use of in very slight degree for the production of yeast, that is, for the development proper of the cell, although more recently sugar materials and inorganic yeast nutrient materials have been largely used.

It has also been ascertained that phosphates, or other phosphorus compounds such as phosphoric acid, and ammonium compounds, or ammonium derivatives, may be used simultaneously for the production of yeast, and that phosphorus compounds alone or ammonium compounds alone exert but a very restricted action. Furthermore, in order to obtain good results, it is preferable to add these substances before the sugar has been utilized by the vital activities of the yeast.

If in a given yeast-nutrient medium, the utilization of the substance therein present is carried on too extensively in the production of yeast, the qualities of the resultant yeast suffer. The trade designates such yeast as "forced" yeast, in the belief that as a result of a too extensive utilization of the nutrients a larger quantity of yeast has been obtained than is properly proportioned to the nutrients employed and that consequently the yeast has been undernourished. Such "forced" yeast may result from a too extensive utilization by the yeast, for its growth, of difficultly assimilable substances and may be caused by too extensive aeration of the liquid in which the yeast is being grown.

Attempts have heretofore been made in aeration processes to use fermenting mediums or yeast nutrients, which have previously been subjected to one fermentation or yeast propagation, similarly to the use of slops in the old Vienna process, for the production of compressed yeast. These attempts were based on the belief that perhaps some valuable substances might still be contained in the slops. In such attempts to utilize slop up to now, there has been only one kind of process which might even remotely be considered as being successful, namely, those processes in which are used slops which are extremely rich in organic acids as a result of some specific treatment such as, for example, a particularly extensive acidification of either the original wort or of the distilled slops. Results from all other similar processes have not heretofore been in proportion to the expenditure in costs and effort.

A more thorough investigation of the processes in operation during the yeast growth and the study of the modifications of the yeast, based on its nutrition, have now resulted in new discoveries of facts, which constitute a marked advance in this field and which have been put into practical execution in the processes which form the basis of my present invention.

Some of the more important of these facts and discoveries are as follows:

A. The characteristics of a yeast produced from a given seed yeast (starting yeast) are determined mainly by the kind and concentration of the substances used in the last stages of its nutrition, particularly by the carbon source utilized by the yeast in the last stage.

B. Sources of nitrogen can only be fully utilized if there is a carbon source in excess, and vice versa, carbon sources can only be fully utilized, if a nitrogen source exists in excess; a complete, simultaneous utilization of both sources by the selection of an optimum ratio thereof not being possible.

C. The presence of phosphates during the utilization of sugar is of the greatest influence on the nature and quantity of the nitrogen sources utilized, not only as they influence the assimilation of the same during this period or stage, but this influence also exists after the main quantity or the total quantity of the sugar has been used, that is, therefore, in the stages in which the yeast mainly utilizes the less easily assimilable carbon sources.

D. Substances which are detrimental to the growth of yeast are eliminated by the yeast to a large extent during the so-called stage of "maturing."

On these facts are based the methods of yeast production or fermentation, constituting my present invention, an object of which is to obtain a high yield of yeast, from the most varied yeast-nutrient mediums, which possesses qualities similar or equivalent in order of excellence to the qualities which heretofore have been possessed usually or exclusively by yeast produced by processes giving only relatively low yields of yeast. For this purpose, yeast-nutrient mediums can be used which heretofore, after many tests, have been considered entirely or almost entirely unsuited for the production of compressed yeast and which have been therefore either discarded or used only for the manufacture of products of an inferior nature, for instance, fodder yeast or fertilizers, or from which gylcerin or various other substances were extracted.

An important feature of the present invention is based upon the fact that by the selection of separate and possibly different yeast-nutrient media, by the modification of the composition of the same yeast-nutrient medium by means of additions made to it during the yeast growing process, or by the combination of the processes in the two classes described above, the yeast growth is conducted in such a predetermined and regulated manner that for one or more periods or stages in which the more difficultly attackable yeast-nutrient substances (in other words the less easily assimilable yeast-nutrient substances) are used, there follow one or more periods or stages, in which relatively more easily attackable yeast-nutrient substances are used.

Consequently the yeast-nutrient medium may be chosen in such a way that the yeast has at its disposal in the beginning of the period of yeast propagation and growth only substances which are not easily attackable, and after a partial utilization thereof or after as complete a utilization as is possible, there follows a stage during which the yeast is supplied with and utilizes nutrient substances of a more easily attackable nature. It will be seen that the start may be made with a period or stage of the second type, followed by one of the first type, and then again by one of the second type in which the yeast growth or fermentation may be terminated at any desired time.

Moreover, any stage can be interrupted or stopped as soon as the desired end is attained. The termination of any stage may be effected by various means, for example:

(a) By a partial removal, or as complete a removal as is feasible, of the nutrient liquid from the yeast, such as, for example, by separating, pressing, etc., or, (b) By the addition of various yeast-nutrients or other substances.

Almost every customary process of yeast manufacture can be altered to allow of using my present invention, by simply introducing new periods or stages into the same.

Ordinarily, the customary methods can be altered to conform with the present invention without changing their fundamental characteristics, particularly in regard to the total quantity of nutrients, which latter may remain constant. The chief modification consists in the introduction of the periods or stages in accordance with the present invention, that is, the regulation of the utilization of the various substances in such a manner that, a period of propagation in a medium containing only less easily attackable yeast-nutrient substances, is followed by at least one period of propagation in a medium containing more easily attackable yeast-nutrient substances.

Preferably a form of operation of the process is adopted wherein as the last period of the process there is established a stage during which the yeast utilizes more easily attackable substances than in the preceding stage (however, usually not the most easily attackable substances). The removal of the yeast from the nutrient medium, which marks the termination of the final period, therefore, occurs advisedly at a stage in which the yeast utilizes more easily attackable substances than in some other preceding stage. A desirable time to remove the yeast, in most cases coincides with that at which there is a maximum of alcohol present in the last stage. The yeast obtained at this time is a finished commercial yeast adapted for baking purposes.

Furthermore, my present invention renders possible the utilization of liquids for the manufacture of compressed yeast which have already undergone fermentation or partial use as yeast-nutrients. As already stated, the use of slops or residual liquids in the production of a yeast-nutrient medium according to the aeration process has heretofore been attempted, but in these attempts the organic acids and the substances broken down incidental to distillation (in the case of slops) were practically the only substances utilized by the yeast. By these methods any further utilization of slops or residual liquids of the kind mentioned, was impossible without a resultant injury to the quality of the yeast, since such substances very soon imprint their characteristics on the yeast, thereby tending to impair the quality of the yeast. In the light of the facts on which the present invention is based, however, the cause of this is readily apparent.

By the process of the present invention, there are two ways in which such liquids can be acted upon, as follows:

1. By allowing the yeast to act on a nutrient medium in the presence of added phosphates or other suitable phosphorus-containing compounds but without added sources of yeast-assimilable nitrogen, advantage can be taken of the fact that under such conditions the yeast for the most part acts on the sugars, whereby the yeast-nutrient nitrogenous substances originally present in the nutrient medium may be partly conserved or stored away for later use.

2. When utilizing these residual liquors or slops, by continuing the operation until the utilization of the least easily attackable substances, which may be done without permanent injury to the yeast produced, if a period of yeast nutrition is allowed to follow hereupon, during which more easily attackable substances are used including at least a substantial portion of the total sugar material used in the process, e. g., 10% thereof.

The following is an example of the manner in which these two methods may be combined:

*Example I.*

100 kilograms of molasses, after the addition of 5 kilograms of Superphosphate, are fermented in the customary manner for production of alcohol, and the alcohol thus produced is distilled off. In its relation to my present invention this addition of the phosphate has the effect that the resultant residual liquor ("still slop") gives better results, if utilized for subsequent yeast nutrition, with the possible addition of new yeast-nutrients, to produce yeast, than if there had been no addition of substances supplying phosphorus.

This residual liquor (or even a residual liquor that has not been enriched by any addition of phosphate) is further worked to produce yeast. About 100 kilos molasses are clarified in the usual manner with 3 kilos Superphosphate and 6 kilos ammonium sulphate, yielding about 300 liters of liquid. About 100 liters of this solution are added to the fermented molasses ("still slop"), which has preferably first been clarified, diluted to about 2.5°–5° Balling and seeded with yeast. The addition of new nutrients at the beginning of this procedure is not absolutely necessary, but is to be preferred for the reason that it makes it possible to work with smaller quantities of seed yeast—with as little as 5 kilos for the above instance. The propagation of the yeast is started with accompanying aeration, and continued until it has approximately reached a maximum. In this case also, similarly to the customary processes, the quality of the yeast is injured as soon as the less easily attackable substances of the slops have been utilized, but this injury, when applying my process, is only of a transitory or temporary nature and is eliminated by the period of stage which follows, in which the yeast utilizes more easily attackable yeast-nutrient substances.

The remaining 200 liters of clarified molasses solution (containing phosphate and ammonium sulphate) are then added and the propagation of the yeast continued until as high a yield of yeast as possible of the desired quality is produced. If only the phosphate has been added to the original wort of the residual liquor, the propagation of the yeast of the desired quality cannot, of course, be continued to the same maximum without the introduction of this latter period or stage.

If slops from grain mashes are used, the phosphate may also be added prior to the primary fermentation. If grain mash is used as an addition to the slops for the production of yeast, the method of utilizing the same is analogous to the instances cited later.

Furthermore, according to this method, compressed yeasts otherwise obtained, which have too little dough-raising power or similar characteristics, may be improved by being treated in about the same manner as the yeast of Fermentation A, as is hereinafter explained under the heading "Example II," Fermentation B.

The following examples are illustrative of methods in their application to the preparation of yeast, without adding other residual liquors.

*Example II.*

Fermentation B:

From 200 kilos corn, 135 kilos malt, 135 kilos malt culms, (possibly with the addition of phosphate alone or with the addition of both phosphate and suitable ammonium compounds or ammonium derivatives), an acidified mash is prepared in the customary manner, and clarification or filtration of the wort or extract is commenced. After the aeration tubes in the yeast propagation vat have been covered with wort (which is being run in from the filters), propagation is "started" with a comparatively large quantity of yeast, which should preferably be approximately bacteriologically pure, but need not have the physiological condition heretofore usually required of "seed" yeast; in fact, yeasts which shows signs of having been "forced" are desirable, (for example, in case of continued operation of the process, the yeast separated from Fermentation A, amounting to about 1,200 liters, fulfills the requirements).

The wort containing the seed yeast is now aerated moderately and washing or sparging of the cereal mash and filtration of the liquid thus obtained is continued further until there are about 7,000 liters in the fermenting vat. Any further washing water that may be required to wash the cereal mash residue is reserved for Fermentation A and in the case of continued operation of the process, the fermented wort of the preceding fermentation may be used in washing out the draff.

The propagation of yeast is now continued up to the point where as high a yield of yeast is obtained as is possible without decided deterioration of the quality of the yeast being noticeable. This point will coincide about with the beginning of the use of the alcohol, that is, at about the moment of maximum alcohol content. In regard to the time, no exact statements can be made. In case of relatively high temperatures, about 28–30° C., and in case of slow clarification the time about coincides with the period in which there are 7,000 liters in the fermenting vat. In case of quick clarification and low temperatures, this period can also be extended for more than 5 hours longer. By selecting this optimum regulation of time, temperature, quantity of air, dilution, etc., it is entirely in the power of the expert to produce yeast of the desired character.

After reaching the desired quality the yeast is separated, preferably allowed to mature under aeration after the separation, whereupon it is pressed off and constitutes the commercial yeast proper.

Fermentation A:

The residue of the wort originating from Fermentation B, partly used for the production of yeast, is clarified if deemed necessary and may be filtered (usually unnecessary) and brought, with any washing waters reserved from the washings or sparging of the spent mash residues of Fermentation B, into a propagating vat.

In the meanwhile 500 kilos molasses, 15 kilos Superphosphate and 15 kilos ammonium sulphate have been clarified in the usual manner to supply 2,000 liters of clarified molasses solution containing the specified nutrient salts. This solution is added to the residues of Fermentation B, contained in the vat for yeast production.

Yeast production is started, with accompanying aeration, by the addition of well-nourished pure yeast ("seed" yeast) and the propagation of yeast is pushed to a maximum, (in a volume of about 9,000 liters of the combined nutrient mediums) whereon the yeast is separated. The resulting residual liquid is usually absolutely worthless and it often does not pay to distill the same. The separated yeast obtained is not commercial yeast, rather it shows all characteristics of having been "forced" and should now be subjected to Fermentation B.

It will be seen that the yeast originating from Fermentation A, is a yeast in which the quality is sacrificed for quantity. The quality is improved in Fermentation B, and valuable yeast-nutrient substances which are not completely utilized in Fermentation B, are not lost, as they are fully utilized in Fermentation A.

The above examples show the nature of this invention in its simplest forms. In

Fermentation A the propagation of yeast starts with the utilization by the yeast of chiefly the yeast-nutrient substances most easily attackable (sugar, amino acids), then continues its course with utilization by the yeast of less and less easily attackable compounds until all the attackable substances in the nutrient medium are substantially exhausted or completely utilized. The yeast thus obtained then enters a nutrient medium in Fermentation B, in which it again utilizes easily attackable substances, and is separated from this nutrient medium at a stage at which the yeast possesses the desired characteristics.

As already stated, this is one of the simplest methods of procedure in accordance with my present invention. It will almost invariably be found advantageous, if several periods are established in Fermentation A, for example, if the total 2,000 liters molasses-nutrient-salt solution is not added all at once, but in the beginning only about 500 liters; then, after the utilization of the same, the balance is added at later periods either at once or at various times. In this connection it is to be noted that the addition used may be composed of two or more different suitable yeast-nutrient liquid combinations with good results. The above is of course also true in regard to the procedure which I have designated, as " Example I."

The object and the result of my invention are also exemplified in another method of procedure, in which the yeast, without having left the fermenting vat in an intermediate stage, is subjected to the different periods of varied nutrition.

*Example III.*

In a solution formed from 100 kilos molasses, 30 kilos Superphosphate, 30 kilos ammonium sulphate, subjected to the customary clarification, after a dilution to 15,000 liters, yeast is propagated and the aeration and duration of the propagation period are regulated in such a manner that with a net yeast yield of about 40% the fermentation and yeast propagation is stopped. The yeast is separated and pressed and thus constitutes a finished commercial yeast. Any alcohol which is incidently produced is preferably distilled from the spent wort. The spent wort which has been freed of the alcohol is subjected to heat with 10 kilos alum, then allowed to precipitate, after half an hour, with addition of 20 kilos chalk, and after being allowed to stand for about 12 hours the clarified liquid is drawn off.

Now 600 kilos molasses, 30 kilos Superphosphate, 30 kilos ammonium sulphate are clarified and diluted with water to 1,500 liters volume. Into the yeast-propagating vat, 13,500 liters are pumped from the clarified liquid of the preceding fermentation and 500 liters of the specified fresh molasses-nutrient-salt solution are added. Seed yeast is now added and the quantity of starting yeast is preferably large in this case, about 40 to 80 kilos, in order that the propagating period need not be continued for too long a time.

Yeast propagation and growth is now allowed to proceed until approximately maximum production of yeast is effected, which is attained in about 5-10 hours. (The determination of this time may be effected in the first runs of the process, or as required, by means of hand centrifugals or test pressing). Then in the course of the next four hours the remaining concentrated nutrient solution is added, and the propagation of yeast continued, until about the time when the alcohol begins to be used, whereupon the yeast is separated and pressed off. In this case it constitutes the finished commercial product. The fermented or spent wort after possible distillation and clarification is used to prepare the next wort in accordance with this same process.

In general, it is usually advantageous to allow the yeast to mature subsequent to the separation, but prior to the pressing, preferably under aeration as it has often been found that if the yeast matures in the total quantity of the nutrient solution or fermenting wort, the latter is less well adapted for further use and on the other hand the maturing or ripening can be better regulated in a separate procedure.

In a form of execution similar to " Example II " the case may also occur that it would be advantageous not only to separate the yeast, but also to compress it, and only then to subject the yeast to "Fermentation B" or, prior to use in "Fermentation B," to subject this yeast possibly to a washing, an acid or other chemical treatment. Many circumstances may make this appear advisable, for instance the use of particularly inferior material for "Fermentation A."

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. A process of manufacturing bakers' yeast which comprises propagating yeast in a nutrient solution with aeration until a high yield of "forced" yeast is obtained and strengthening the "forced" yeast by propagating it in a second nutrient solution until it has good baking and keeping qualities; the nutrients of the first mentioned solution being principally composed of ingredients that are relatively difficultly assimilable by yeast, and the nutrients of the second nutrient solution being principally composed of ingredients that are relatively easily assimilable by yeast.

2. A process of manufacturing bakers' yeast which comprises propagating yeast in a nutrient solution with aeration until a high yield of "forced" yeast is obtained and strengthening the "forced" yeast by propagating it in a second nutrient solution until it has good baking and keeping quality the nutrients of the first-mentioned nutrient solution including some sugars but being of ingredients that are relatively difficultly assimilable by yeast, and the nutrients of the second nutrient solution being principally composed of ingredients that are relatively easily assimilable by yeast and including sugar material in an amount comprising at least a substantial portion of the total sugar materials of both nutrient solutions.

3. A process of manufacturing bakers' yeast which comprises propagating yeast in a nutrient solution with aeration until a high yield of "forced" yeast is obtained, removing the yeast produced, subjecting it to a purifying treatment, and strengthening the "forced" yeast by propagating it in a second nutrient solution until it has good baking and keeping qualities; the nutrients of the first mentioned nutrient solution being principally composed of ingredients that are relatively difficultly assimilable by yeast, and the second nutrient solution being principally composed of ingredients that are relatively easily assimilable by yeast.

4. A process of manufacturing bakers' yeast which comprises propagating yeast in a nutrient solution with aeration until a high yield of "forced" yeast is obtained, removing the yeast produced, subjecting it to a purifying treatment, returning the yeast to the partially utilized nutrient solution, adding a substantial portion of a fresh nutrient solution, the nutrients of which are principally composed of substances relatively easily assimilable by yeast, continuing the aeration thereafter until the relatively easily assimilable substances are assimilated and withdrawing, separating and pressing the yeast.

5. A process of manufacturing bakers' yeast which comprises propagating yeast in a nutrient solution with aeration until a high yield of "forced" yeast is obtained and strengthening the "forced" yeast by propagating it in a second nutrient solution until it has good baking and keeping qualities; the nutrients of the first nutrient solution being principally composed of ingredients that are relatively difficultly assimilable by yeast and having a ratio of yeast assimilable carbon to yeast-assimilable nitrogen sources such that in the presence of only the more difficultly attackable sources of one of these components an abundance of the sources of the other is present, and the nutrients of the second nutrient solution being principally composed of ingredients that are relatively easily assimilable by yeast.

6. A process of manufacturing bakers' yeast which comprises propagating yeast in a nutrient solution with aeration until a high yield of "forced" yeast is obtained and strengthening the "forced" yeast by propagating it in a second nutrient solution until it has good baking and keeping qualities; the first nutrient solution being composed principally of distillers slop, and nutrients of the second nutrient solution being principally composed of ingredients that are relatively easily assimilable by yeast.

7. A process of manufacturing bakers' yeast which comprises propagating yeast in a nutrient solution with aeration until a high yield of "forced" yeast is obtained and strengthening the "forced" yeast by propagating it in a second nutrient solution until it has good baking and keeping qualities; the first nutrient solution being composed of liquids which have already been partially utilized for yeast growth, and the nutrients of the second nutrient solution being principally composed of ingredients that are relatively easily assimilable by yeast.

8. In a process of manufacturing bakers' yeast the steps which comprise adding a compound containing yeast-assimilable phosphorus to a yeast nutrient liquid containing sugars and low in yeast-assimilable nitrogen, converting at least a substantial part of the sugars into alcohol by fermentation, at least partially removing the alcohol by distillation, adding compounds containing yeast assimilable nitrogen to the residual liquor thus obtained, propagating yeast therein with aeration until a high yield of "forced" yeast is produced, and strengthening the "forced" yeast by propagating it in a nutrient solution, the nutrients of which are composed principally of substances that are relatively easily assimilable by yeast.

9. A process of manufacturing bakers' yeast which comprises propagating yeast in nutrient solutions with aeration, such propagation being carried on in stages such that first a high yield of "forced" yeast is obtained by propagating yeast in nutrient solutions, the nutrients of which are principally composed of ingredients that are relatively difficultly assimilable by yeast and in a subsequent stage the "forced" yeast is strengthened by propagating it in a second nutrient the nutrients of which are principally composed of ingredients that are relatively easily assimilable by yeast until it has good baking and keeping qualities.

10. A process of manufacturing bakers' yeast which comprises propagating yeast in a nutrient medium with aeration until a high yield of "forced" yeast is obtained, removing the yeast produced, subjecting it to a purifying treatment, and strengthening the "forced" yeast by propagating it in a second nutrient medium until it has good baking and keeping qualities; the second nutrient medium being principally composed of ingredients of a relatively easily assimilable character.

In witness whereof, I have hereunto signed my name to this specification the 30th day of July, 1923.

DR. ERWIN KLEIN.